US006181094B1

(12) United States Patent
Menke

(10) Patent No.: US 6,181,094 B1
(45) Date of Patent: Jan. 30, 2001

(54) POWER OPERATOR FOR MOTOR-VEHICLE TRUNK LID

(75) Inventor: Johannes-Theodor Menke, Velbert (DE)

(73) Assignee: Kiekert AG, Heiligenhaus (DE)

( * ) Notice: Under 35 U.S.C. 154(b), the term of this patent shall be extended for 0 days.

(21) Appl. No.: 09/405,648

(22) Filed: Sep. 24, 1999

(30) Foreign Application Priority Data

Sep. 26, 1998 (DE) ............................................ 198 44 265

(51) Int. Cl.[7] ...................................................... G05B 5/00

(52) U.S. Cl. ............................ 318/434; 318/468; 49/28; 49/140; 49/340

(58) Field of Search .................................... 318/432–434, 318/280, 282, 283, 445, 446, 447, 466, 468; 49/26–28, 29, 31, 139, 140, 150, 158, 280, 325, 337, 340, 360–363

(56) References Cited

U.S. PATENT DOCUMENTS

| | | | | |
|---|---|---|---|---|
| Re. 36,267 | * | 8/1999 | Moore et al. | 49/340 |
| 2,850,140 | * | 9/1958 | Compeau | 198/464.2 |
| 4,173,845 | * | 11/1979 | Heesch | 49/350 |
| 4,851,742 | * | 7/1989 | Chapman | 318/286 |
| 4,862,640 | * | 9/1989 | Boyko et al. | 49/213 |
| 5,063,760 | * | 11/1991 | Horita et al. | 70/23 |
| 5,069,000 | * | 12/1991 | Zukerman | 49/28 |
| 5,189,839 | * | 3/1993 | DeLand et al. | 49/360 |
| 5,239,779 | * | 8/1993 | DeLand et al. | 49/360 |
| 5,319,880 | * | 6/1994 | Kuhlman | 49/360 |
| 5,448,856 | * | 9/1995 | Moore et al. | 49/340 |
| 5,531,498 | * | 7/1996 | Kowall | 296/146.4 |
| 5,535,553 | * | 7/1996 | Staser et al. | 49/502 |
| 5,636,814 | * | 6/1997 | Rollert | 49/360 |

* cited by examiner

*Primary Examiner*—David Martin
(74) *Attorney, Agent, or Firm*—Herbert Dubno; Andrew Wilford

(57) ABSTRACT

A power operator for opening and closing a trunk lid of a motor vehicle has a spring engaged between the vehicle and the lid for urging the lid from a closed position into an open position, a rod having an outer end connected to the door and an inner end, and a clutch rotatable about a clutch axis and having an output member connected to the rod inner end and an input member. A drive motor connected to the input member is energizable for rotating the clutch elements and thereby displacing the rod and door. Another spring in the clutch rotationally decouples the clutch elements from each other only when a torque applied to the input element exceeds a predetermined limit. A controller energizes the motor for a predetermined amount of time.

9 Claims, 4 Drawing Sheets

POWER OPERATOR FOR MOTOR-VEHICLE TRUNK LID

FIELD OF THE INVENTION

The present invention relates to a power actuator for a motor-vehicle panel. More particularly this invention concerns such an actuator used to open and close the trunk lid, hatch back, or similar part of a motor vehicle.

BACKGROUND OF THE INVENTION

A standard power feature of a motor vehicle is a power opener/closer for the trunk lid, hatch back, or similar panel. The panel in question is normally mounted generally pivotally, typically by means of curved arms, for movement between a closed position sitting flush in its opening and an open position giving access to the opening. The mechanism can normally be actuated for opening by means of the vehicle's remote controller that also unlocks the passenger and driver doors. It is normally set to close when pushed down into a partially closed position. Thus the user can pop the trunk remotely, making it easy to load without having to put down whatever is going into the trunk to have hands free for operating the trunk latch, and easy to close in that the user need merely push it down somewhat, whereupon the power operator will take over and pull the panel to and latch it.

In a typical such system as described in U.S. Pat. No. 4,851,742 of Chapman the panel, here a trunk lid, is urged into the open position by a spring strong enough to raise the lid all the way up. A motor has a drive wheel or pulley around which is secured a cable whose outer end is attached to the door offset from the hinge so that when the cable is payed out the spring opens the panel and when the cable is wound up the door is pulled down against the force of the spring.

The problem with such a system is that it is fairly common for something, for instance the objects loaded into the trunk, to block full closing of the door. In this case the door will stop in a partially closed position. To prevent the motor from burning out, as the motor is normally shut off by automatic actuation of a switch as the panel reaches its fully closed position, a current-monitoring system is connected to the operator's controller. Thus, when the controller senses excess current consumption indicating that the motor is operating against too great a load, the motor is shut off and a warning signal is emitted.

This system is relatively complex. The motor has to be very powerful since it serves to operate against the spring on closing, although it only acts as a brake on opening. The opening movement is wholly the responsibility of the spring which must be very powerful. Finally the system is subject to damage if the panel is moved forcibly during an opening or closing cycle, if for instance a person tries to stop or raise the lid as it is closing.

Another system described in U.S. Pat. No. 2,850,140 of Compeau has a releasable coupling device which decouples the operator from the drive when closing of the door is impeded or some force operates opposite the closing force. While this system effectively protects the operator motor without the complexity of a current-monitoring system, once it decouples it leaves the power-closing feature inoperative. Recoupling the operator is a relatively complex job normally only undertaken by trained service personnel.

OBJECTS OF THE INVENTION

It is therefore an object of the present invention to provide an improved power operator for a motor-vehicle trunk lid or the like.

Another object is the provision of such an improved power operator for a motor-vehicle trunk lid or the like which overcomes the above-given disadvantages, that is which surely opens and closes the lid or panel in question, that is of simple construction, and that can be jammed or overridden with no damage to its parts and no requirement to reset it afterward.

SUMMARY OF THE INVENTION

A power operator for opening and closing a pivotal panel of a motor vehicle has according to the invention a spring engaged between the vehicle and the panel for urging the panel from a closed position into an open position, a rod having an outer end connected to the door and an inner end, and a clutch rotatable about a clutch axis and having an output member connected to the rod inner end and an input member. A drive motor connected to the input member is energizable for rotating the clutch elements and thereby displacing the rod and door. Another spring in the clutch rotationally decouples the clutch elements from each other only when a torque applied to the input element exceeds a predetermined limit. A controller energizes the motor for a predetermined amount of time.

This system has the advantage of extreme simplicity. If anything interferes with the opening or closing of the panel, e.g. a trunk lid or hatch back, the clutch will slip harmlessly, thereby preventing any of the operator parts from being damaged while protecting anything the panel is engaging from being damaged. There is no need to reset the system after something has happened that has caused the clutch to slip, merely to restart it in either direction. Similarly the slippage is even employed at the ends of the opening and closing strokes, eliminating the need for end-limit switches that start or stop these cycles. The system according to the invention even allows the panel to be opened manually in case of a power outage without damage to the operator. What is more, the operator completely opens the trunk, does not merely set it ajar, so that a person with his or her arms full can press the appropriate button on the remote to open the trunk fully so that the load can be set directly inside.

The output member carries offset from the axis a connection on which the rod inner end is pivoted. In addition the biasing means includes a spring biasing the clutch elements axially into engagement with each other. This spring includes at least one spring washer. The clutch elements are formed as clutch disks formed with axially projecting and interengaging teeth that have inclined flanks. More particularly the teeth of each disk are separated by intervening notches. The notches of one of the disks are angularly substantially longer than the teeth of the other of the disks. Thus there is some slip in the clutch at all times, whenever it changes direction, for smoothest possible action.

The drive includes a stepdown transmission having an input connected to the motor and an output gear fixed to one of the disks. Furthermore the clutch is provided with a housing containing the clutch elements and biasing means and formed with an arcuate slot centered on the clutch axis. The output member has a connection projecting axially through the slot.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
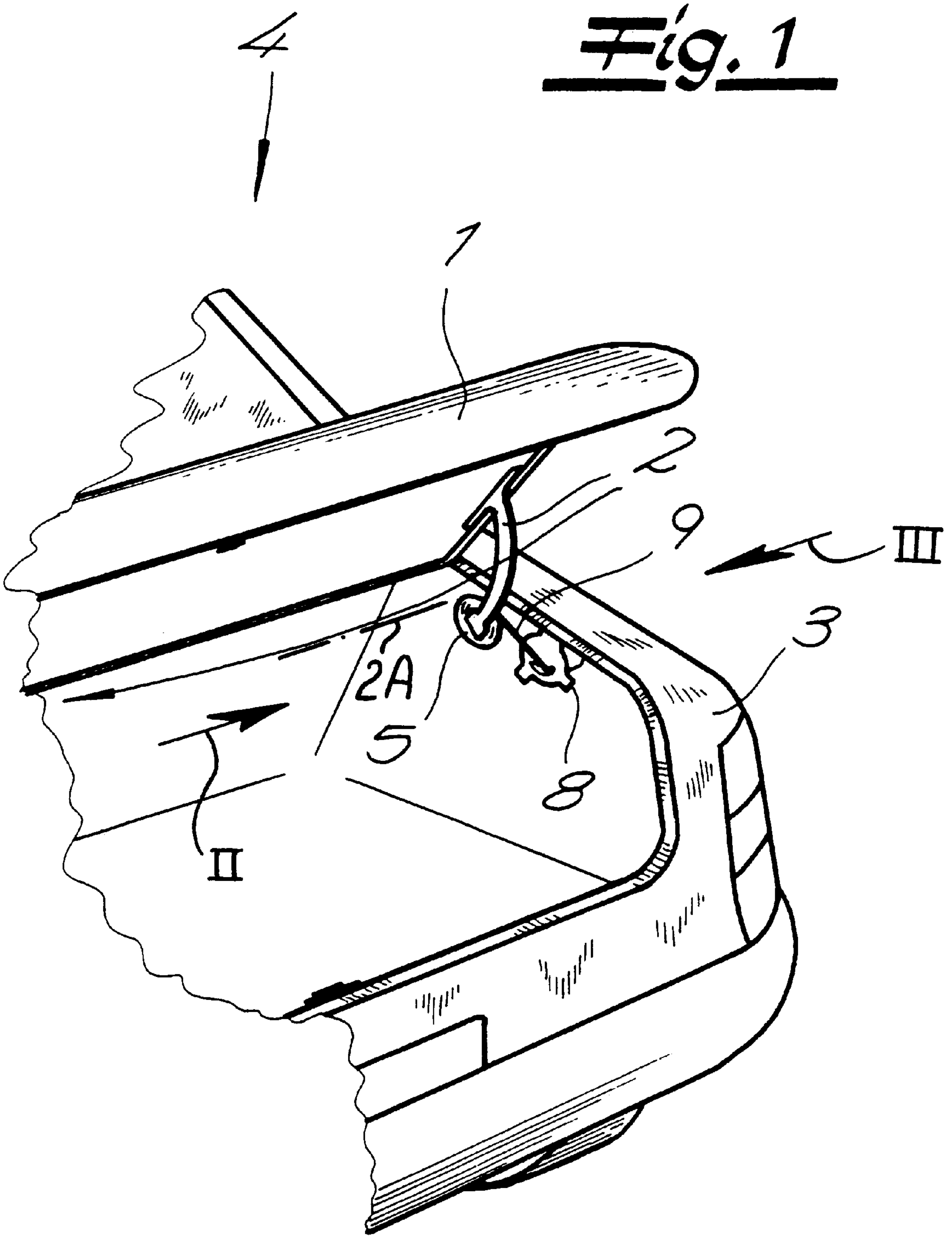
FIG. 1 is a small-scale perspective view of the operator according to the invention.
Figure 2:
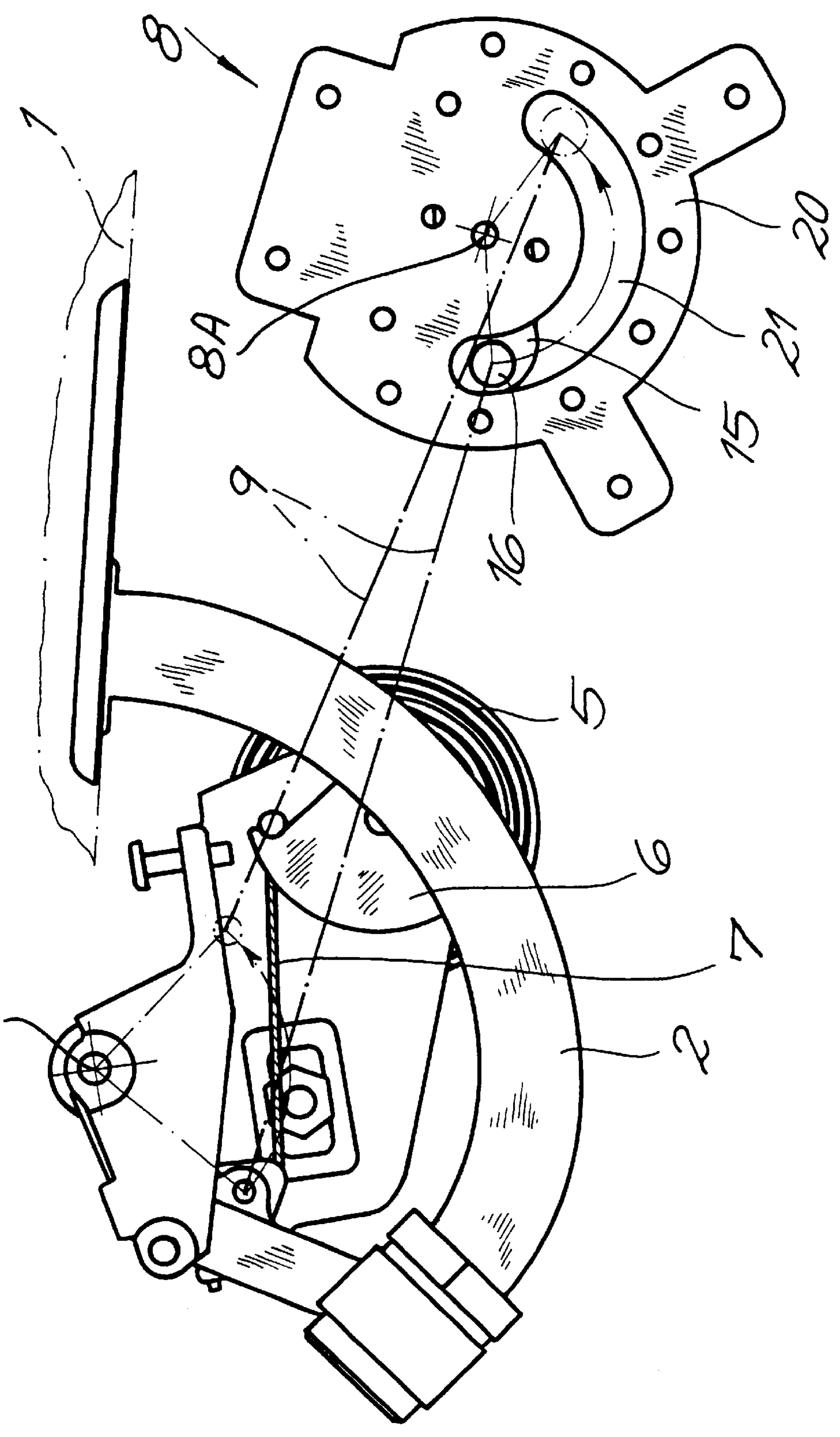
FIGS. 2 and 3 are side views taken in the direction of respective arrows II and III of FIG. 1.
Figure 3:
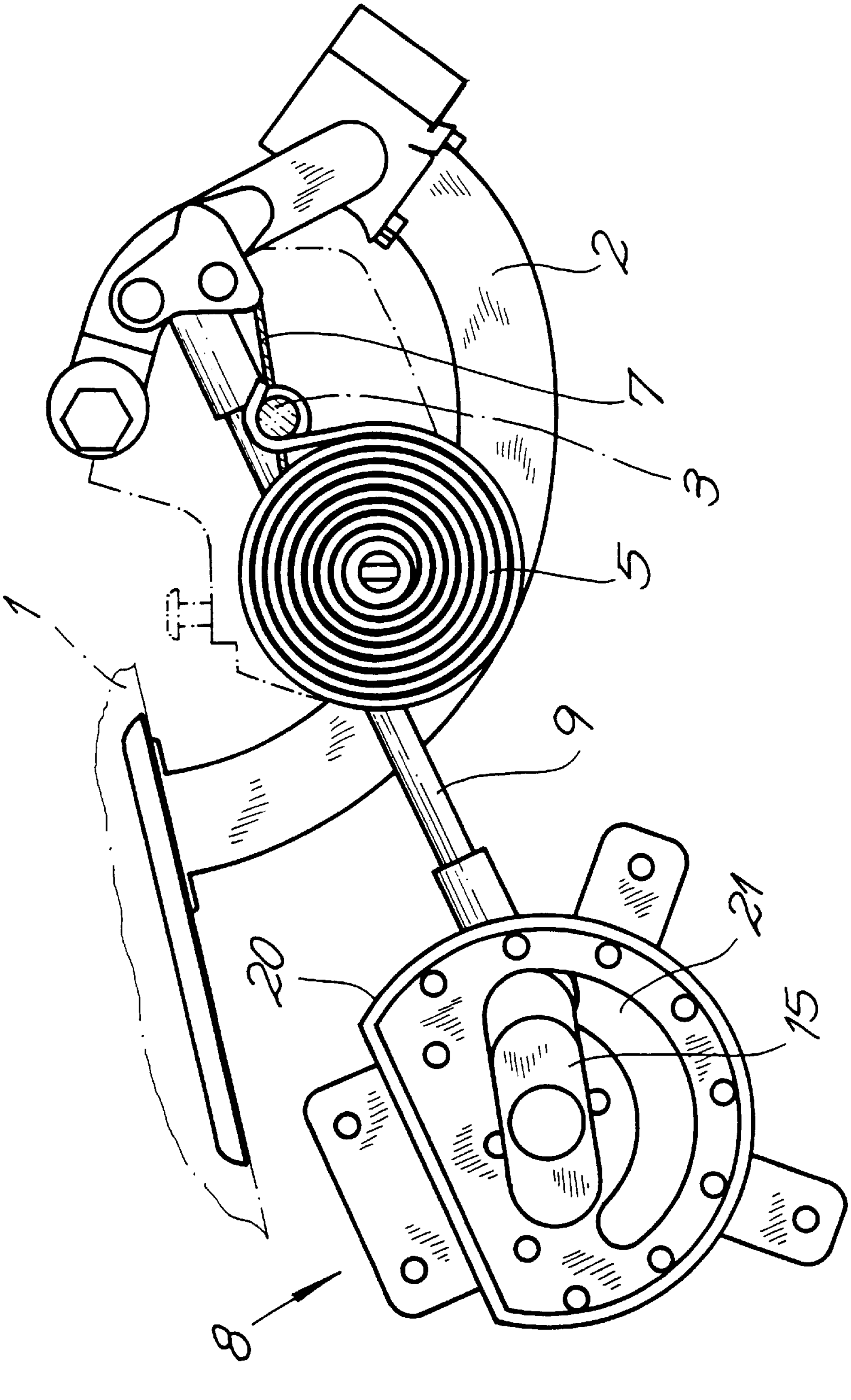
Figure 4:
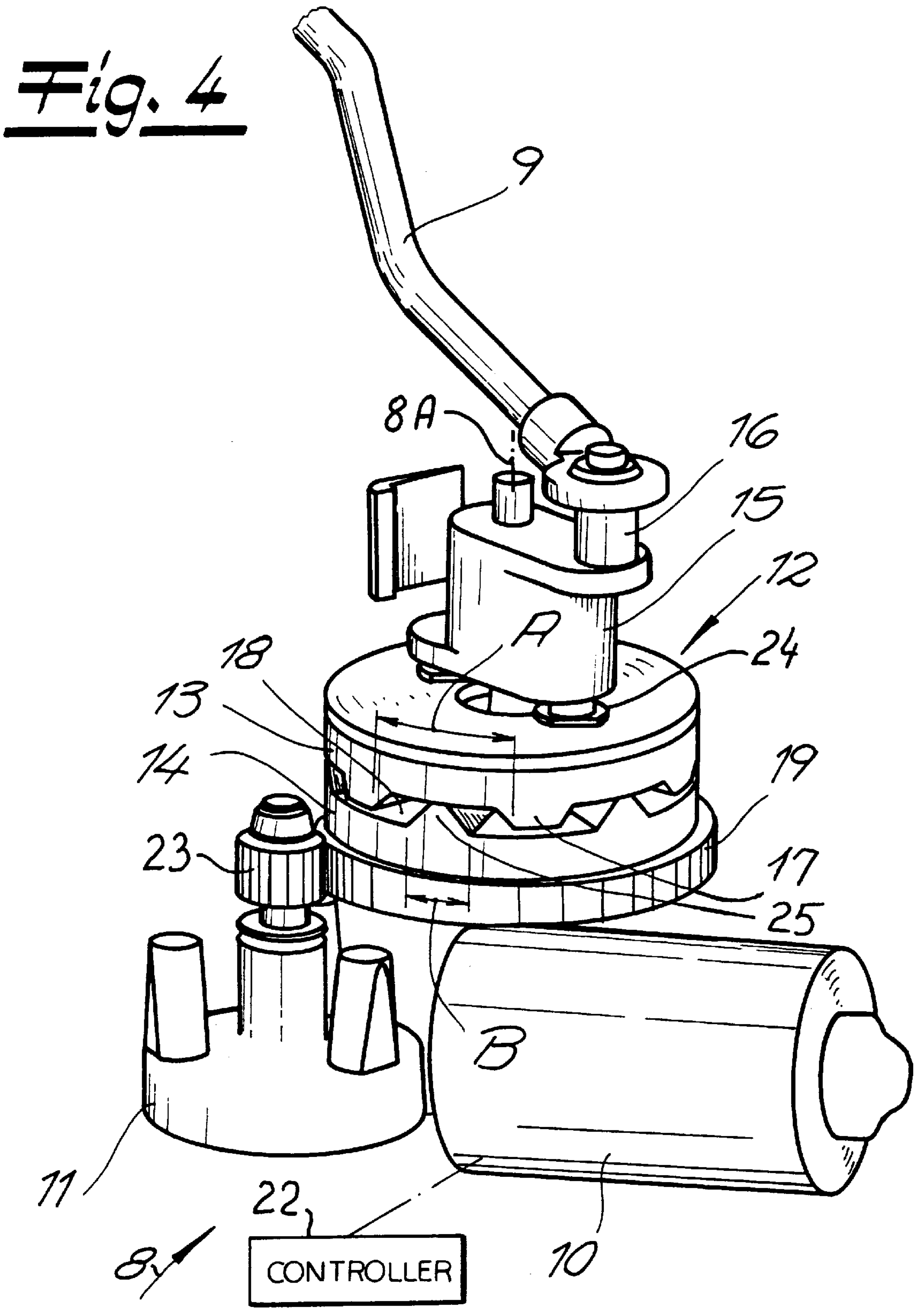
FIG. 4 is a partly diagrammatic view of the motor assembly of the operator.

As seen in FIG. 1 a trunk lid 1 is secured by hinge arms 2 to a body 3 of a motor vehicle 4 for pivotal movement about a generally horizontal axis 2A between the illustrated open position and a closed position. A torsion spring 5 mounted on the body 3 has one end hooked as shown in FIG. 3 on the body 3 and an opposite end coupled as shown in FIG. 2 to an eccentric wheel 6 whose outer periphery is connected via a cable 7 to the hinge arm 2. Thus the spring 5 will apply torque to the wheel 6 so as to raise the lid 1 into the open position. According to the invention the effective torque force of the spring 5 is normally roughly equal to the weight of the lid 1 so that the spring 5 merely makes the lid 1 easy to open and close, canceling out its weight.

In accordance with the invention a power operator 8 has a rigid rod arm 9 having an outer arm connected to the hinge 2 offset from its axis 2A and an inner end operatively connected to a motor 10 operated by a controller 22. More specifically the reversible electric motor 10 has a worm-drive output connected via a stepdown transmission 11 to a pinion 23 meshing with a large-diameter gear wheel 19 rotatable about an operator axis 8A and connected via a clutch 12 to an output element 15 having an eccentric crank connection 16 on which the inner end of the rod 9 is pivoted. As shown in FIG. 2 a housing 20 surrounding the operator 8 has an arcuate output port 21 through which the connection 16 projects.

The clutch 12 has two elements 13 and 14 respectively fixed to the gear 19 and output element 15 and having interengaging teeth 17 and 25 separated by notches 18. Belleville-washer springs 24 press the element 13 against the element 14, engaging the teeth 17 and 25 in the notches 18 of the disks 13 and 14. The teeth 17 of the element 13 are of triangular shape while the teeth 25 of the other element 14 and the notches 18 are of isosceles trapezoidal shape. The notches 18 of the element 13 have a width A which is greater than the width b of the teeth 25 of the element 14 so that some relative rotation of the two part 13 and 14 is possible in all cases.

The motor 10 is reversible and is operated by a simple timer-type controller 22 which is set to energize this motor 10 for a predetermined amount of time in one direction or the other, the amount of time being set to be ample to ensure full opening or full closing under normal circumstances. Thus to open the lid 1 the motor 10 rotates the clutch 12 in one direction about the axis 8A so that the rod 9 pushes up the lid 2, whose weight is substantially canceled out by the spring 5. To close the lid 1 the motor 10 oppositely displaces the rod 9. Under normal circumstances a dedicated switch, which is operated from inside the car or from a remote controller, is closed to initiate the closing movement. The opening movement is typically initiated by a switch that is tripped when the trunk latch is released, either manually or remotely.

The clutch 12 is of the limited-torque or torque-release type that only transmits torque between its parts 13 and 14 when this torque is below a predetermined level. Thus if something impedes movement of the lid 1 in either direction the teeth 17 of the input element 14 will simply press the output element 13 axially against its springs 24 and the teeth 17 and 25 of the two elements will angularly pass each other, without moving the rod 9. Thus if the lid 1 is blocked open or closed and an attempt it made to power close or open it, the clutch 12 will simply chatter briefly and then, once the actuation time runs out, go quiet, all without damage to any parts. The device is simply reset by clearing what is in the way and restarting the open or close cycle. In fact the system is set up so that no limit switches are needed to shut off the motor 10; instead this motor 10 is simply operated for a fixed amount of time in each cycle, slipping briefly once the trunk lid 1 reaches the fully closed or fully open position. In a situation of complete power failure the lid 1 can be unlocked manually and forced open (or even closed) without damage to its parts since the clutch 12 is made to slip.

I claim:

1. A power operator for opening and closing a pivotal panel of a motor vehicle, the operator comprising:

spring means engaged between the vehicle and the panel for urging the panel from a closed position into an open position;

a rod having an outer end connected to the door and an inner end;

a clutch rotatable about a clutch axis and having an output member connected to the rod inner end and an input member;

drive means including a drive motor connected to the input member and energizable for rotating the clutch elements and thereby displacing the rod and door;

biasing means in the clutch for rotationally decoupling if the clutch elements from each other only when a torque applied to the input element exceeds a predetermined limit; and control means for energizing the motor for a predetermined amount of time.

2. The power operator defined in claim 1 wherein the output member carries offset from the axis a connection on which the rod inner end is pivoted.

3. The power operator defined in claim 1 wherein the biasing means includes a spring biasing the clutch elements axially into engagement with each other.

4. The power operator defined in claim 3 wherein the spring includes at least one spring washer.

5. The power operator defined in claim 3 wherein the clutch elements are formed as clutch disks formed with axially projecting and interengaging teeth.

6. The power operator defined in claim 5 wherein the teeth have inclined flanks.

7. The power operator defined in claim 6 wherein the teeth of each disk are separated by intervening notches, the notches of one of the disks being angularly substantially longer than the teeth of the other of the disks.

8. The power operator defined in claim 5 wherein the drive means includes a stepdown transmission having an input connected to the motor and an output gear fixed to one of the disks.

9. The power operator defined in claim 5 wherein the clutch is provided with a housing containing the clutch elements and biasing means and formed with an arcuate slot centered on the clutch axis, the output member having a connection projecting axially through the slot.

* * * * *